United States Patent
Bockhold et al.

(10) Patent No.: US 10,070,063 B2
(45) Date of Patent: Sep. 4, 2018

(54) INTEGRATED VIDEO CAPTURING AND SHARING APPLICATION ON HANDHELD DEVICE

(71) Applicant: Ligos Corporation, Savannah, GA (US)

(72) Inventors: Keith Bockhold, Vancouver (CA);
Murray Bockhold, Vancouver (CA);
Richard Cowart, Savannah, GA (US);
Robert W. Saint John, Cleveland, OH (US); Dave Wolf, Savannah, GA (US)

(73) Assignee: GRIDEO TECHNOLOGIES INC., Vancouver (CA)

( * ) Notice: Subject to any disclaimer, the term of this patent is extended or adjusted under 35 U.S.C. 154(b) by 660 days.

(21) Appl. No.: 14/627,483

(22) Filed: Feb. 20, 2015

(65) Prior Publication Data
US 2016/0248840 A1 Aug. 25, 2016

(51) Int. Cl.
| | |
|---|---|
| *G06F 3/0482* | (2013.01) |
| *G06F 3/0484* | (2013.01) |
| *H04L 12/58* | (2006.01) |
| *H04L 29/08* | (2006.01) |
| *H04N 5/232* | (2006.01) |

(52) U.S. Cl.
CPC ....... *H04N 5/23293* (2013.01); *G06F 3/0482* (2013.01); *G06F 3/04842* (2013.01); *G06F 3/04847* (2013.01); *H04L 51/046* (2013.01); *H04L 51/32* (2013.01); *H04N 5/23216* (2013.01)

(58) Field of Classification Search
CPC ....... H04L 67/06; H04L 51/046; H04L 51/32; G06F 3/0482; G06F 3/04842; G06F 3/04847; H04N 5/23293; H04N 5/23229
See application file for complete search history.

(56) References Cited

U.S. PATENT DOCUMENTS

| | | | |
|---|---|---|---|
| 8,428,453 B1 * | 4/2013 | Spiegel | H04N 5/23216 396/299 |
| 9,083,661 B2 * | 7/2015 | Appelman | G06Q 10/107 |

(Continued)

OTHER PUBLICATIONS

Music Photo Life blog, "Save Your Instagram Video in Your Smartphone Without Uploading", uploaded on Jun. 29, 2013 to http://musicphotolife.com/2013/08/save-your-instagram-video-in-your-smartphone-without-uploading, retrieved Mar. 10, 2018.*

(Continued)

*Primary Examiner* — Shourjo Dasgupta

(57) ABSTRACT

An integrated application program for video shooting, video sharing, video editing and contact information management on a mobile device. Upon being invoked, the application program directly enters into the video shooting mode of a graphical user interface (GUI) where a user can start to shoot a video after interacting with the GUI only once. Further, contact information is represented using a grid like visual object within the GUI. A grid includes a plurality of pictorial tiles, each representing a contact group. The social grid is customizable by user configurations and/or automatically based on a number of predefined factors. Once recipients are selected from the grid, the video message can be transmitted to the selected recipients. All functionalities can be within a single application program resident on the mobile device.

19 Claims, 10 Drawing Sheets

(56) References Cited

U.S. PATENT DOCUMENTS

| | | | |
|---|---|---|---|
| 9,542,076 B1 | 1/2017 | Onyon et al. | |
| 9,710,661 B2* | 7/2017 | Choi | G06F 21/606 |
| 2007/0186182 A1 | 8/2007 | Schiller | |
| 2009/0143052 A1* | 6/2009 | Bates | G06F 17/30575 |
| | | | 455/414.2 |
| 2010/0043062 A1 | 2/2010 | Alexander et al. | |
| 2010/0162171 A1 | 6/2010 | Felt et al. | |
| 2011/0026898 A1* | 2/2011 | Lussier | G11B 27/034 |
| | | | 386/280 |
| 2012/0162266 A1 | 6/2012 | Douglas et al. | |
| 2012/0182316 A1 | 7/2012 | Moha et al. | |
| 2013/0117365 A1* | 5/2013 | Padmanabhan | H04W 4/206 |
| | | | 709/204 |
| 2013/0145259 A1 | 6/2013 | Kiefer, III et al. | |
| 2013/0212507 A1* | 8/2013 | Fedoseyeva | G06Q 10/00 |
| | | | 715/765 |
| 2013/0303143 A1* | 11/2013 | Schrader | H04W 12/08 |
| | | | 455/418 |
| 2014/0019871 A1 | 1/2014 | Bluvband et al. | |
| 2014/0164939 A1 | 6/2014 | Tamura | |
| 2014/0164994 A1* | 6/2014 | Myslinski | G06F 1/163 |
| | | | 715/808 |
| 2014/0179426 A1 | 6/2014 | Perry et al. | |
| 2014/0282166 A1* | 9/2014 | Temkin | G06F 3/04845 |
| | | | 715/769 |
| 2014/0344288 A1 | 11/2014 | Evans et al. | |
| 2015/0074606 A1 | 3/2015 | Melen | |
| 2015/0220249 A1* | 8/2015 | Snibbe | G06F 3/0412 |
| | | | 715/719 |
| 2015/0281577 A1* | 10/2015 | Ruben | H04N 5/23216 |
| | | | 348/220.1 |
| 2015/0373065 A1* | 12/2015 | Holmquist | H04L 65/403 |
| | | | 715/753 |
| 2016/0006721 A1* | 1/2016 | Patel | H04L 63/0815 |
| | | | 726/8 |
| 2016/0057154 A1 | 2/2016 | Ferguson et al. | |
| 2016/0179864 A1* | 6/2016 | Roberts | G06F 17/30958 |
| | | | 707/609 |
| 2016/0188894 A1* | 6/2016 | Factor | G06F 21/6218 |
| | | | 713/165 |
| 2016/0197993 A1* | 7/2016 | Perkowski | H04L 67/1097 |
| | | | 709/203 |

OTHER PUBLICATIONS

"Instagram How to: An Easy Tutorial", uploaded Jun. 27, 2012 to https://www.thesitsgirls.com/social-media/how-do-i-use-instagram, retrieved Mar. 10, 2018.*

Colleen Taylor, Tech Crunch blog, "Instagram Launches 15-Second Video Sharing Feature, With 13 Filters and Editing", uploaded Jun. 20, 2013 to https://techcrunch.com/2013/06/20/facebook-instagram-video/, retrieved Mar. 10, 2018.*

Kevin Systrom, Instragram blog, "Introducing Video on Instagram", uploaded Jun. 20, 2013 to http://blog.instagram.com/post/53448889009/video-on-instagram, retrieved Mar. 10, 2018.*

Joab Jackson, Computerworld, "New Instagram Feature Allows Users to Share Photos, Videos With Specific People", uploaded Dec. 12, 2013 to https://www.computerworld.com/article/2486829/social-media/new-instagram-feature-allows-users-to-share-photos--videos-with-specific-people.html, retrieved Mar. 10, 2018.*

Jacob Kastrenakes, The Verge, "Instagram Direct: A Look at Private Chats for Your Photos and Videos", uploaded Dec. 12, 2013 to https://www.theverge.com/2013/12/12/5203742/instagram-direct-photo-video-messaging-service-hands-on, retrieved Mar. 10, 2018.*

Stephanie Buck, Mashable, "The Beginners Guide to Instagram", uploaded May 29, 2012 to https://mashable.com/2012/05/29/instagram-for-beginners/#leCDlxvqqZqZ, retrieved Mar. 10, 2018.*

Jordan Crook, TechCrunch, "Instagram Video vs. Vine", uploaded Jun. 20, 2013 to https://techcrunch.com/2013/06/20/instagram-video-vs-vine-whats-the-difference/, retrieved Mar. 14, 2018.*

Adam Pash, "Add an Instant-Record Button to Your Home Screen and Never Miss the Money Shot", published on Jul. 8, 2011 to https://lifehacker.com/5819454/add-an-instant-record-button-to-your-home-screen-and-never-miss-the-money-shot, retrieved Jun. 6, 2018.*

Billy Gallagher, "Snapchat Has a Patent That Could Help It Become the Defacto Camera App", published on Jun. 21, 2013 to https://techcrunch.com/2013/06/21/snapchat-has-a-patent-that-could-help-it-become-the-defacto-camera-app/, retrieved Jun. 6, 2018.*

Neil Gonzalez, "A Faster Way to Record Videos of Fleeting Moments on Your iPhone", published on Apr. 19, 2014 to https://ios.gadgethacks.com/how-to/faster-way-record-videos-fleeting-moments-your-iphone-0154462/, retrieved Jun. 6, 2018.*

* cited by examiner

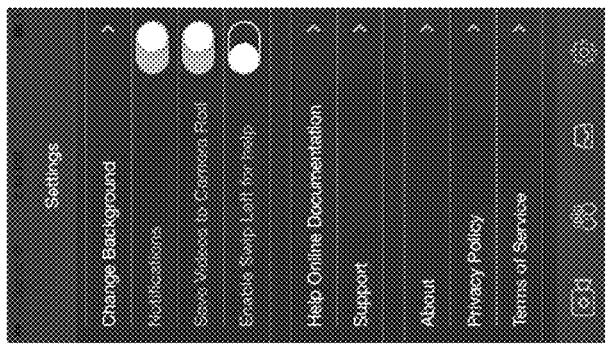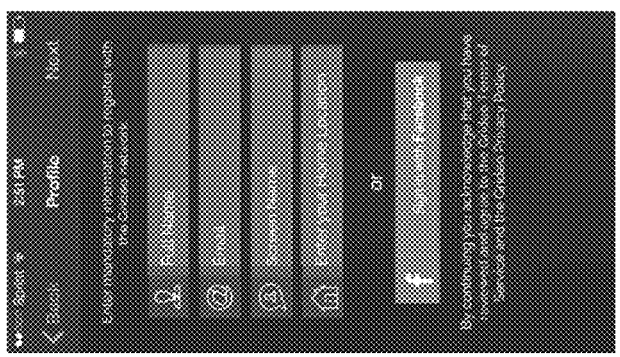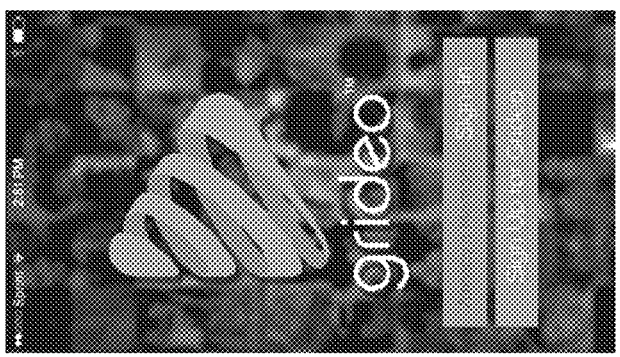
FIG. 4

810
820
830
FIG. 8

INTEGRATED VIDEO CAPTURING AND SHARING APPLICATION ON HANDHELD DEVICE

TECHNICAL FIELD

The present disclosure relates generally to the field of application software for social media networks, and, more specifically, to the field of video sharing in social media networks and user interfaces thereof.

BACKGROUND

It has become increasingly popular for users of social media network to share video clips, messages and discussions with each other using mobile computing devices, such as smartphones or other tablets. However, the video capture and sharing functionalities on mobile devices are usually poorly integrated and limited. For instance, a user typically needs to shoot a video clip using a software application native to a mobile device (e.g., the "camera" feature), and then open another application software and use its "share" feature which allows the user to access the video from a gallery folder and post it to a social media network of choice. The posting process may also be complex, requiring several selections, etc.

In addition, conventional social network applications designed for mobile computing devices have insufficient features for users to manage and organize recipients efficiently within the applications. A user is often forced to manage contact information through a web browser on a different type of device (usually a desktop personal computer, through a web browser interface, etc.) before sharing a video with the selected recipients. In other words, the functionality to modify contacts is not allowed on the mobile device. Further, a user is typically forced to first choose recipients before shooting and adding a video for sharing. These existing methods inevitably restrict the users' ability to capture spontaneous moments on video and then quickly share them with a wide audience.

SUMMARY OF THE INVENTION

Therefore, it would be advantageous to provide application software, e.g., an "application," that integrates the functionalities of quick video capturing and immediate sharing using mobile computing devices, such as smartphones. It would also be advantageous to provide a simple and intuitive user interface for users to efficiently manage and use contact information on a mobile computing device.

Accordingly, embodiments of the present disclosure employ a computer implemented method of rendering a graphical user interface (GUI) on a mobile computing device through which a user can capture a video quickly and then share it with predefined contact groups or individuals. Upon an application program embodying the present disclosure being invoked in a mobile computing device, the GUI directly enters into a video shooting mode such that a user can shoot, e.g., capture, a video immediately upon a single user interaction with the GUI. If the user elects to share the video via the Internet, the GUI enters into a message composing mode to receive other related data, e.g., user entries of a caption, a comment, and a representative thumbnail, etc.

When the user confirms to share the video message, the GUI enters a contact information management mode in which the user can select intended recipients for the video sharing message. In some embodiments, the contact information management mode features a grid like visual object including a plurality of pictorial tiles, each representing a contact group, an individual, or an external network, etc. A user interaction with a pictorial tile identifies a corresponding contact group as recipients for the video sharing message. The grid like visual object is customizable by user manual configurations. The visual object may also be dynamically adjusted in an automated fashion based on characteristics of the contact groups, such as the number of individuals in each contact group, the amount of messaging activities related to each contact group, and the user indicated preferences for each contact group, etc.

Advantageously, a user of a mobile computing device can conveniently shoot videos, manage contact information, select recipients, and share the videos within an integrated application environment. The user does not need to step into a gallery function native to the mobile device to select a pre-recorded video file for sharing. In addition, a user's contact information is aggregated and organized into a pictorial grid like visual object, which is intuitive and convenient to manage as opposed to the conventional approaches in which contacts are displayed with merely text labels and possibly icons.

According to one embodiment of the present disclosure, a method for video sharing on a mobile device comprises: upon invoking of an application resident and executed by a processor on the mobile device, rendering a first graphical user interface that automatically enters a video capture mode to capture a video using a camera system of the device. Upon capture of the video, a second graphical user interface of the same application is displayed and allows meta data addition to the video. Responsive to a user interaction with a share button in the second graphical user interface, a grid like on-screen display is presented within the same application. The grid like on-screen display comprises a plurality of tiles, each tile corresponding to either a contact or a plurality of contacts grouped together. Responsive to a user selection of a selected tile of the plurality of tiles, the same application automatically transmits the video for receipt by one or more recipients as identified by the selected tile. In this embodiment, a single application program can be used to perform all these features.

Furthermore, responsive to a user selection of a respective tile, the same application program enters into an edit mode where the respective tile or the corresponding contact group can be edited via the mobile device based on user input. The video may be maintained within a memory resident within the mobile device subsequent to the transmitting.

According to another embodiment of the present disclosure, a non-transitory computer-readable storage medium embodying instructions that, when executed by a processing device, cause the processing device to perform a computer implemented method of facilitating video sharing in a social network. The method comprises: upon invoking of an application resident and executed by a processor on the mobile device, rendering a first graphical user interface that automatically enters a video capture mode to capture a video using a camera system of the device. Upon capture of the video, a second graphical user interface of the same application is displayed and allows meta data addition to the video. Responsive to a user interaction with a share button in the second graphical user interface, a contact list is presented. Responsive to a user selection from the contact list, the same application automatically transmits the video to one or more recipients selected from the contact list.

According to another embodiment of the present disclosure, a handheld computing system comprises: a processor; a communication device coupled to the processor; a touchscreen display coupled to the processor; a camera subsystem coupled to the processor; and memory coupled to the processor and comprising instructions that, when executed by the processor, cause the system to perform a method of sharing videos through a social media network. The method comprises, upon invoking of an application resident and executed by a processor on the mobile device, rendering a first graphical user interface that automatically enters a video capture mode to capture a video using a camera system of the device. Upon capture of the video, a second graphical user interface of the same application is displayed and allows meta data addition to the video. Responsive to a user interaction with a share button in the second graphical user interface, a grid like on-screen display is presented within the same application. The grid like on-screen display comprises a plurality of tiles, each tile corresponding to either a contact or a plurality of contacts grouped together. Responsive to a user selection of a selected tile of the plurality of tiles, the same application automatically transmits the video for receipt by one or more recipients as identified by the selected tile.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 4 illustrates an exemplary GUI in an account configuration mode in accordance with an embodiment of the present disclosure;

FIG. 8 shows examples of message center pages of the GUI configured for video shooting and sharing according to an embodiment of the present disclosure;

DETAILED DESCRIPTION

Figure 1:
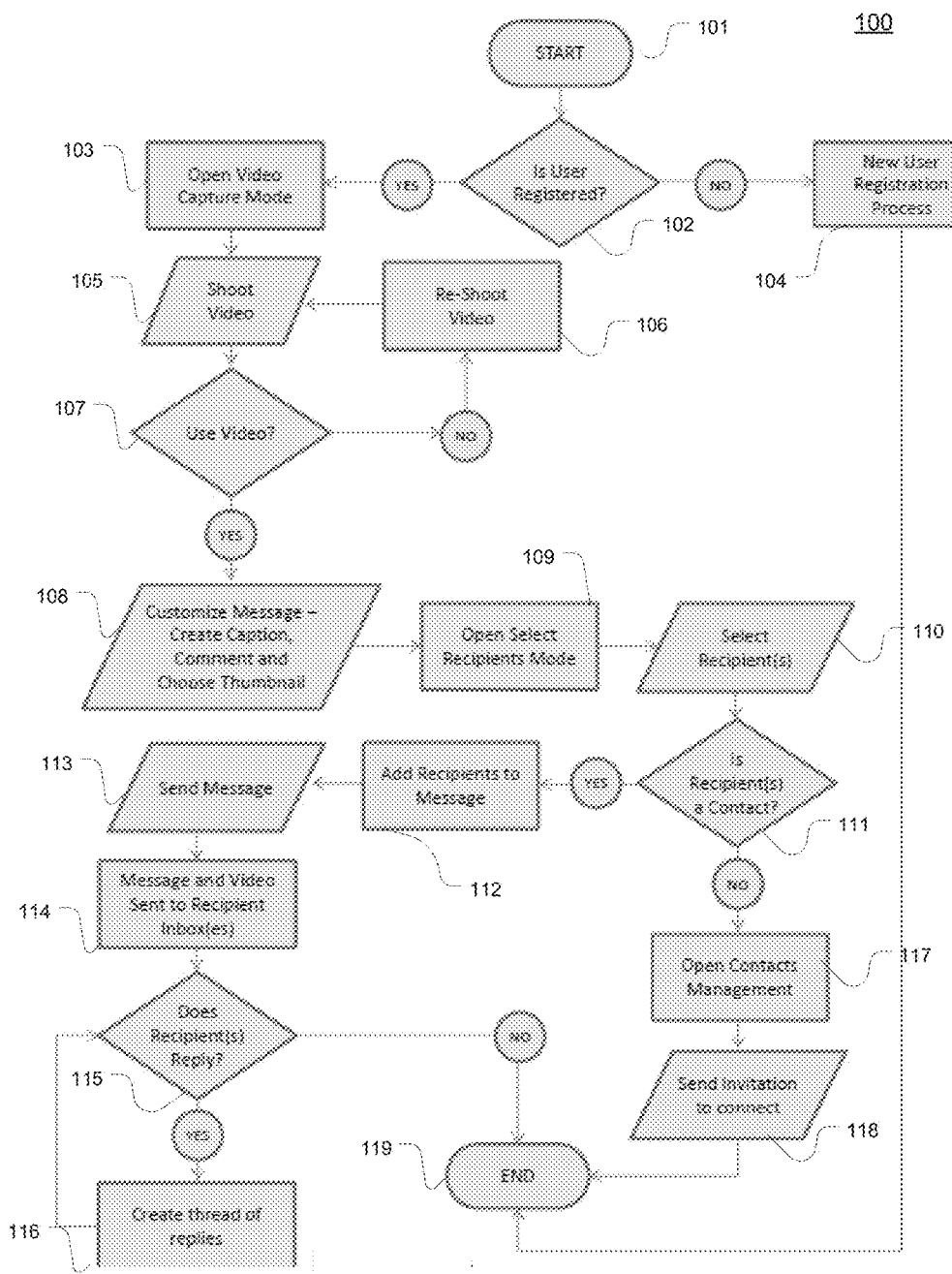
FIG. 1 is a flow chart depicting an exemplary computer implemented process of capturing a video and sharing the video responsive to user interactions with a GUI in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Integrated Video Capturing and Sharing Application for Handheld Device

Overall, according to embodiments of the present disclosure, a single application program implemented on a mobile computing device integrates the functionalities of video shooting, video editing, video sharing and contact information management. Upon being invoked, the application program directly enters into the video shooting mode of a graphical user interface (GUI) where a user can start to capture a video after interacting with the GUI only once. Further, contact information is represented using a grid like visual object within the GUI, or herein a "social grid". A social grid includes a plurality of pictorial tiles, each representing a contact group, such as an individual, a group of individuals, or an external social network, etc. The social grid is customizable by user configurations and/or automatically based on a number of predefined factors, such as the number of individuals included in a group, the frequency of contacting a contact group, the user-indicated preference for a contact group, etc. The same application can be used to transmit the video to selected contacts.

Hereinafter, the terms "video," "video file," "audiovideo," "video clip," "video content" are used interchangeably; the terms "shoot," "capture," and "record" are used interchangeably.

FIG. 1 is a flow chart depicting an exemplary computer implemented process 100 of capturing a video and sharing the video responsive to user interactions with a GUI in accordance with an embodiment of the present disclosure. Process 100 is an instantiation of a single application program executable on a mobile computing device, e.g., a smartphone, a tablet, etc. Such a device is equipped with one or more cameras and a touch screen display. The application program provides a platform for registered users of one or more social media networks to communicate with each other via the social media network servers, such as to send text messages, and share photos, audio clips, video clips or other digital contents, etc. Responsive to user input through the GUI, the application program controls the camera system of the mobile device to capture videos, edit videos, organize contacts, select one or more contacts and transmit the video to the selected contact(s).

As shown, a new user first follows a registration process to obtain authorization in order to avail himself the services provided by a social network using a mobile device, as in 101, 102 and 104. However, if the user has been authenticated, the GUI directly enters into a video shooting mode upon the application program being invoked by the user at 103. At 105, the GUI receives a user instruction to capture a video through the GUI. For example, this user instruction corresponds to a user single touch gesture on a "record" button on the GUI (e.g., button 301 in FIG. 3). However, it will be appreciated that the present disclosure is not limited to any specific user gesture or other input means to invoke a corresponding function described therein.

After review, if the user decides not to share the video with other users at 107, another video can be captured (or recaptured) at 106. The initially captured video file may be automatically discarded or saved to a gallery folder accessible to the application program.

On the other hand, if the GUI receives a user instruction to share the video at 107, the GUI enters into message composing mode at 108 to receive user input for a caption, a comment, or alike, to edit the video in this fashion. The video clip is automatically attached to the message. The user can also chose a still or moving image thumbnail to represent the video content.

In the instant embodiment, message communications via a social network are restricted to registered users who have previously connected with each other in the same social network, e.g., by accepting each other as a "friend" or "link" in the social network. Recipients of the message are first selected by the user. The message is sent out to the selected recipients, as in 112 and 113, through a server hosted by the social network. Once the message is sent, at the sender's option, the original video file may remain stored in the sender's mobile computing device or be maintained in a remote storage managed by the server.

More specifically, once a video sharing message is created, the GUI enters into a recipient select mode at 109 to receive a user selection on one or more recipients of the message. The user selects recipients from a contact list. In some embodiments, the contact list is represented by a grid like visual object (or social grid), as will be described in greater detail below. The user may select an individual, multiple individuals, or a pre-configured contact group (for example "Family," "Classmates," etc) to receive the message.

If any selected contact is not connected with the sender in the social network ("unconnected contact"), as determined at 111, the sender can open a contact management window within the GUI at 117 and send an invitation to connect at 118. But the video message cannot be delivered to the unconnected contact until the contact accepts the invitation. However, in some other embodiments, a video message can be delivered to unconnected contacts as well. Further, in some embodiments, the application program provides an integrated interface for multiple social networks and hence a video message can be sent to the sender's contacts in different social networks.

Once the video message is uploaded to the server, at 114, the server sends notifications to the recipients' message inbox about the new message. A GUI according to the present disclosure can present received video sharing messages as well as playback video files therein. In one embodiment, if a recipient opens the video message for view, the video is downloaded to the recipient's mobile device. Alternatively, the video is streamed to the recipient's mobile device for play. At 115, if a recipient composes a response through the GUI to the sender and optionally to other recipients, a shared message thread is created between the sender and the recipients at 116. The thread can build up with additional responses from the recipients and the sender. The foregoing process 103-119 is repeated each time a video file is captured and shared.

Therefore, according to the present disclosure, a user can conveniently shoot videos, edit video messages, manage contact information, and share videos with selected recipients all within the environment of an integrated GUI of a single application resident on a mobile device. The GUI directly enters to a video shooting mode upon the program being invoked, facilitating a user to capture spontaneous moments. Moreover, the user does not have to step into a gallery function native to the mobile device to select a pre-recorded video file, or start within the gallery and to use its share function.

Figure 2:
FIG. 2 illustrates an exemplary GUI rendered on the display device of a mobile computing device and configured to receive user input to capture and share videos according to an embodiment of the present disclosure.

It will be appreciated that various GUI configurations and designs can be used without departing from the purview of the present disclosure. FIG. 2 illustrates an exemplary on-screen GUI 200 rendered on the display device of a mobile computing device and configured to receive user input to capture and share videos according to an embodiment of the present disclosure. In the instant example, GUI 200 is in a contact management mode where contact groups are represented by pictorial tiles arranged into a grid like pattern, or a social grid 210. A user interaction with a pictorial tile identifies the whole contact group as selected recipients for a video message, as will be described in greater detail below. A user interaction with the plus icon 225 leads to a GUI window allowing the user to add a contact group in the social grid. The "Edit" button 226 allows a user to edit the social grid, e.g., delete a contact group from the grid. The GUI also includes the on-screen buttons 221-224 for users to switch to another GUI mode, including the video shooting mode button 221, the social grid management and display button 222, the message center button 223, and option configuration button 224. In the illustrated example, the number of received new messages is displayed on the message center button 223.

Figure 3:
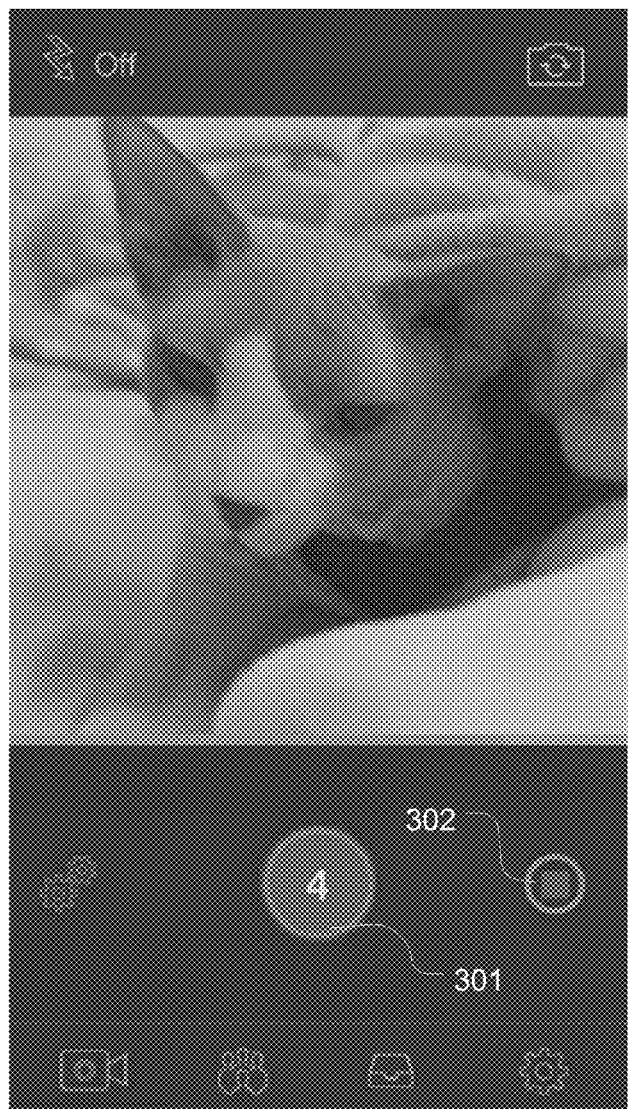
FIG. 3 illustrates an exemplary GUI in a video shooting mode in accordance with an embodiment of the present disclosure.

FIG. 3 illustrates an exemplary on-screen GUI 300 in a video shooting mode in accordance with an embodiment of the present disclosure. Upon loading the application program, the GUI 300 directly enters into this video shooting mode. Once a user simply taps on the button 301, the camera is triggered to record. In some embodiments, the user can edit the video during recording, such as pause, resume, zoom, slow motion, etc. After the user stops the recording by tapping the button 302, the user can review the video and may choose to discard it and re-shoot one. If the user chooses to keep the video, the GUI 300 automatically switches to the message composing mode for the user to compose a video sharing message, as will be described in detail with reference to FIG. 7.

FIG. 4 illustrates an exemplary on-screen GUI 400 in an account configuration mode in accordance with an embodiment of the present disclosure. The present disclosure is not limited to any specific type of social media networks through which users can share videos using mobile devices. An application program according to the present disclosure may be dedicated to a single social network or serve as a generic platform for multiple social networks selected by the device user.

Diagram 410 shows a greeting page displayed once a new user installs the exemplary application program. In this example, the program links to a social network named "Grideo." Diagram 420 shows an account setup page for a user to register with the network and build a network of contacts, including connecting with existing Grideo users, sending invitations to phone contacts or social network contacts, setting up application preferences, etc. In this example, a user account with an external social network "Facebook" can be synchronized with "Grideo." Diagram 430 shows a "Settings" page in which a user can set personal references, such as profile information, notification settings, support access, privacy settings, and others. For example, the option page is prompted open when a user interacts with the "options" button 224 in FIG. 2.

According to the present disclosure, a contact list is visualized using a grid like visual object, or a social grid. FIG. 5A illustrates an exemplary social grid layout 510 in accordance with an embodiment. Layout 510 is composed of tiles 511-518 of varying sizes, aspect ratios, colors, etc. Each tile is substantially rectangular shaped and assigned with a sample name. The "Family" tile 511, "Best Friends" tile 514, "Work" tile 515, and "External Network" tile 516 are exemplary and represent respective contact groups, each including one or more individual contacts or an external social network. The "John" and "Mary" tiles 512 and 513 represent respective contact individuals. The icons 517 and 518 represent user management tools. Layout 510 may be one of many layout templates provided by the application program.

A social grid is user configurable with respect to tile locations, sizes, aspect ratios, labels, colors, and representative images etc. In some embodiments, a social grid may be automatically and dynamically adjusted based on a set of attributes of the contact information represented by the tiles. For example, the tiles are rearranged and repositioned based on the number of individuals included in a group, a communication frequency between the group and the user, a user preference indication ("favorite" or "regular") and so on.

Figure 5B:
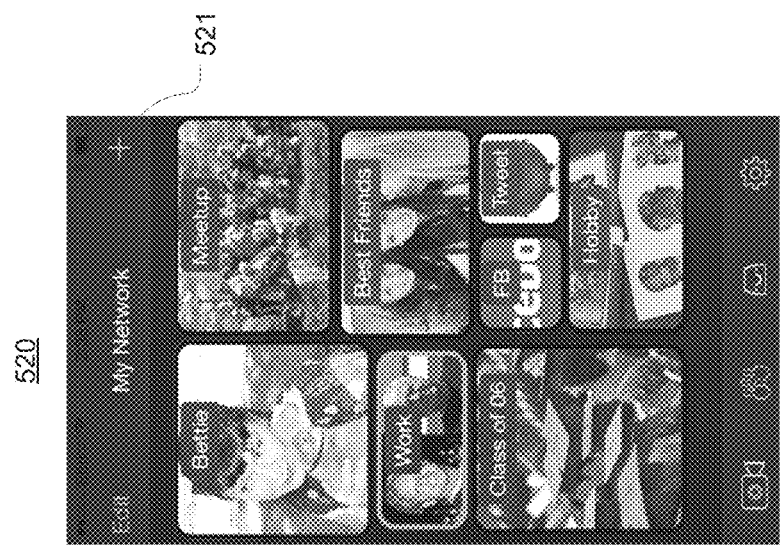
FIG. 5B illustrates an exemplary social grid populated with the user's contacts based on the social grid layout in accordance with an embodiment of the present disclosure.
Figure 5A:
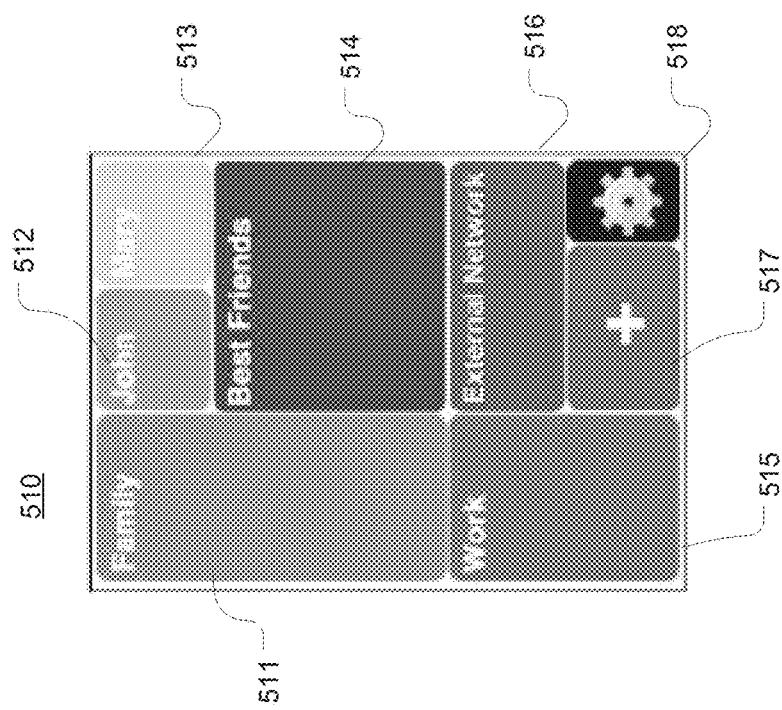
FIG. 5A illustrates an exemplary social grid layout in accordance with an embodiment of the present disclosure.

FIG. 5B illustrates an exemplary social grid 520 populated with the user's contacts based on social grid layout 510. Each contact or contact group is represented by a user-selected image in the tile, which may be a still image or a moving image. The user can customize the images assigned to the tiles. Further, a social grid may include multiple pages accessible through swiping or other suitable use interactions with the GUI. The social grid advantageously provides an intuitive visualization of contact information and hence facilitates a user to manage and access the information therein. Moreover, the social grid may provide access to additional data related specifically to the selected group, such as a description and or a summary history of communications received from and sent to the individual(s).

Figure 6:
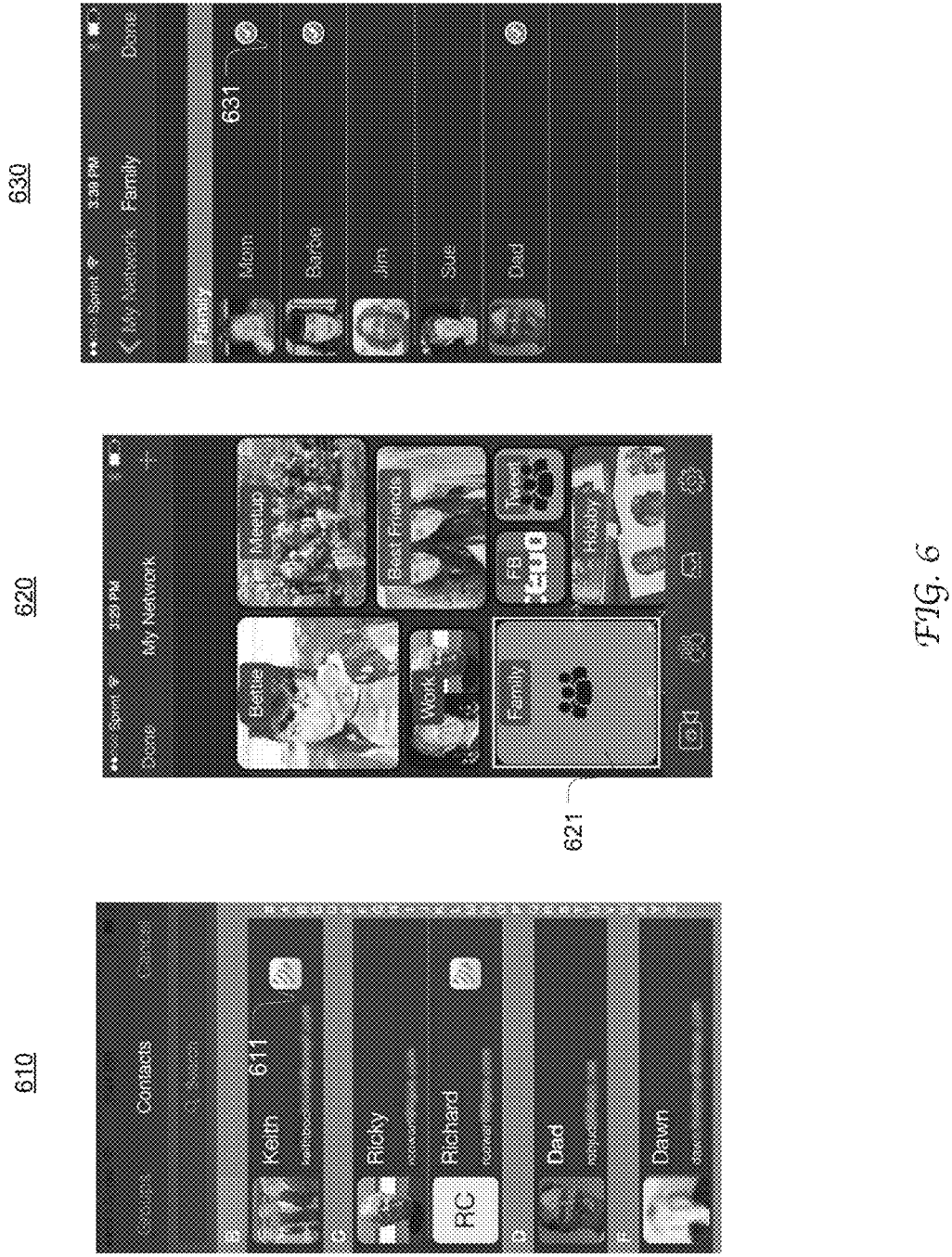
FIG. 6 illustrates exemplary contact list pages from which a user can select contacts and add to contact groups in a social grid in accordance with an embodiment of the present disclosure.

A user interaction with the "plus" icon 521 leads to a contact list page. A user can use the mobile device to add a new tile for a new individual contact or a new group. FIG. 6 illustrates exemplary social grid editing pages 610, 620 and 630 from which a user can edit contact groups and the visual presentation features of the social grid in accordance with an embodiment of the present disclosure. Contacts selected from the contact list shown in 610 are added to an existing group in the social grid 520 in FIG. 5B. The icon "611" indicates the affiliation status of an individual with the network "Grideo." Diagram 620 shows the pictorial tile "Family" 621 is being adjusted responsive to user input. For instance, the user can drag the edges of the tile to change the aspect ratio, pinch in/off to adjust the size, or type in a new name for the group. The user can navigate through their existing contacts to select and add to the group. Diagram 630 shows that a user can select/deselected individuals within a group to identify recipients, as indicated by the check marks 631. Thus, contact information as well the visual representation thereof can be conveniently edited, e.g., changed or deleted or added using the mobile device.

Figure 7:
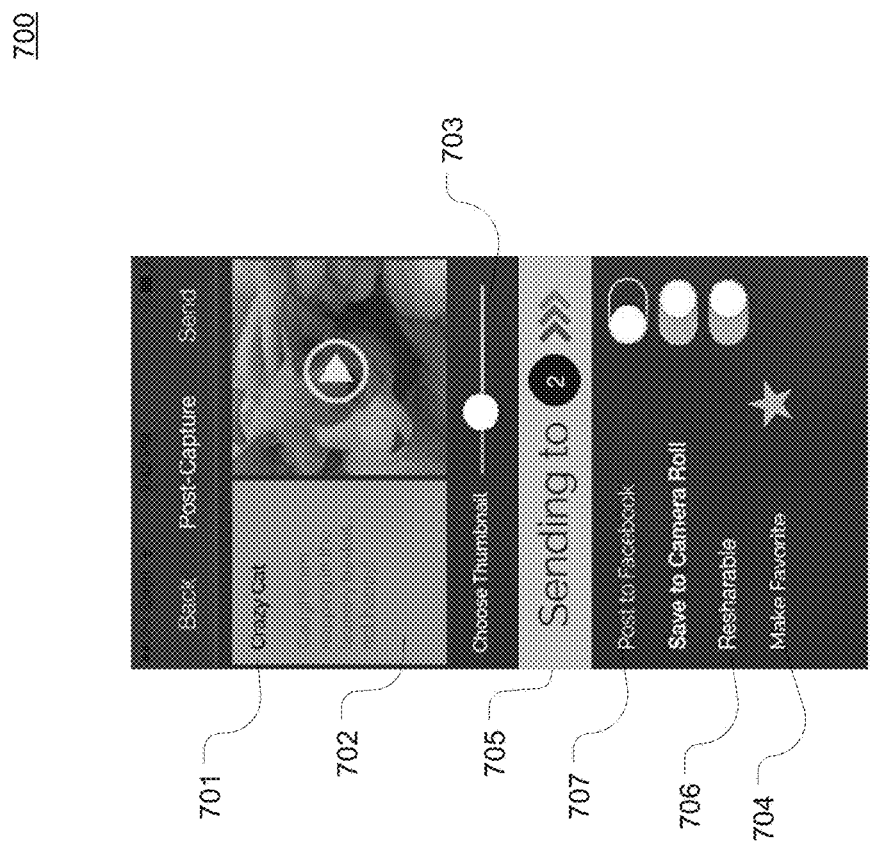
FIG. 7 illustrates an exemplary GUI in a message composing mode in accordance with an embodiment of the present disclosure.

After a video is recorded and the user elects to share it, the GUI presents a message composing page. FIG. 7 illustrates an exemplary on-screen GUI 700 in a message composing mode in accordance with an embodiment of the present disclosure. The user can caption the video in area 701, leave an optional comment in area 702, and select one from several thumbnails using the bar 703 to represent the video. The user can choose to save the video to the local storage in the mobile device. Alternatively, in another mode, the video is deleted from the mobile device once it is uploaded to the social network server and stored in a remote storage managed by the server. The user can tap the icon 704 to indicate that this video is a "Favorite," so that it is easily accessible in the message center later. In one embodiment, each registered user is assigned with a definitive storage volume in the remote storage. Older videos may be automatically purged to make room for the newly uploaded videos. A "Favorite" status can protect a video from such a purge operation such that the video can remain stored for a longer or indefinite time until the user requests to remove it. The user can also assign additional data to the communication. In this example, a user can use the switch 706 to set whether or not the clip is resharable to others outside the original specified recipients, and use the switch 707 to post the clip directly to his or her "Facebook" account.

When a message is completed, a user tap gesture on the "Sending to" on-screen button 705 brings up the social grid as shown in FIG. 5B. The user can select a group and/or single contact (for example, "Family" and "Susan") to share the video with the contacts in the group, e.g., by single-tapping the corresponding tile. The user can also choose only selected recipients within a group by interacting with, e.g., double-tapping, the corresponding tile to open a page 630 in FIG. 6. Then the user can review and send or discard the message. Once the user confirms to send the message out, e.g., by clicking an on-screen "send" button included in the social grid page, the message content is uploaded to the server which parses the recipient information and notifies recipients of the new video message in their own message inboxes, thereby transmitting the video message to all selected recipients.

Inbound and outbound messages are organized at a message center of the GUI. The message center coordinates and presents the ongoing feed of inbound messages, outbound messages, comments associated with those messages, and notifications of new messages. FIG. 8 shows examples message center pages 810, 820 and 830 of the GUI configured for video shooting and sharing according to an embodiment of the present disclosure. Diagram 810 shows an "Inbox" page listing the inbound messages and the accompanying threads received from the social network. Diagram 820 shows a "Sent" page listing the outbound messages and the accompanying threads. Diagram 830 lists only the Favorite messages including marked outbound and inbound messages.

Figure 9:
FIG. 9 illustrates an exemplary message viewing page of the GUI according to an embodiment of the present disclosure.

By selecting any of the listed messages, the user can open the video for playback and view the accompanying text within the GUI, and leave a reply as shown in FIG. 9. This creates a shared thread amongst the recipients. FIG. 9 illustrates an exemplary message viewing page 900 of the GUI according to an embodiment of the present disclosure. The message view page can present the video 901 and the conversation thread 902 about it. Any user involved in the thread will receive new inbox notifications when new replies are added. Recipients can mark the message as a favorite to add the message to the "Favorite" box for easy access later on.

Figure 10:
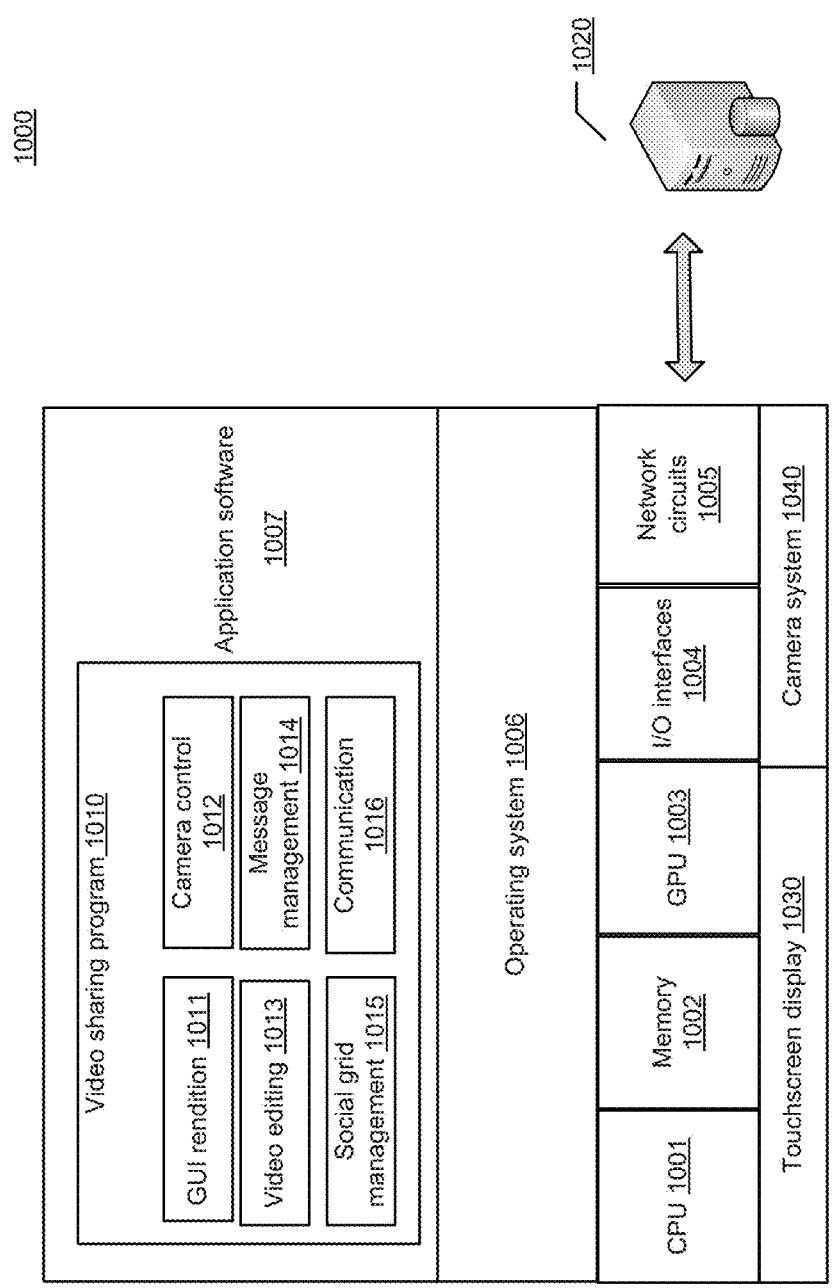
FIG. 10 is a block diagram illustrating an exemplary mobile computing device including a video shooting and sharing program in accordance with an embodiment of the present disclosure.

FIG. 10 is a block diagram illustrating an exemplary mobile computing device 1000 including a video shooting and sharing program 1010 in accordance with an embodiment of the present disclosure. The computing device 1000 includes a central processing unit (CPU) 1001, memory 1002, an optional graphics processing unit (GPU) 1003, I/O interfaces 1004, network circuits 1005, an operating system 1006, a camera system 1040, and a touchscreen display 1030. The memory 1002 stores application software 1007 including the video shooting and sharing program 1010. The computing system 1000 may be a smart phone, a touch pad, or other mobile computing devices. The mobile operating system 1006 may be Android, iOS, Windows or alike. The device 1000 is communicably coupled to a social network server 1020 via the Internet.

In addition to video sharing messages, a video shooting and sharing application according to the present disclosure also provides a user interface for users to communicate in other manner, such as emails, instant text messages, and/or video calls, etc.

The video shooting and sharing program 1010 includes a GUI rendition module 1011, a camera control module 1012, a video editing module 1013, a message management module 1014, a contact grid management module 1015, and a communication module 1016. The GUI rendition module renders various GUI pages or modes for display on the touchscreen display device 1030. The camera control module 1012 controls the operations of camera system 1040 based on user instructions received by the GUI, e.g., capturing a video, pausing or resuming the video capturing, etc. The video editing module 1013 provides editing functionalities for a user to edit the video during and after the capturing. The message management module 1014 organizes inbound and outbound messages and notifications in a message center. The social grid management module 1015 organizes the contact in a grid like pattern and adjusts the pattern based on user input and/or automatically. The communication module 1016 communicates with the server regarding inbound and outbound video sharing messages.

The video shooting and sharing program 1010 may perform various other functions as discussed in detail with reference to FIG. 1-FIG. 9. As will be appreciated by those with ordinary skill in the art, the video shooting and sharing program 1010 can be implemented in any one or more suitable programming languages that are known to those skilled in the art, such as C, C++, Java, Python, Perl, C#, SQL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for video sharing on a mobile device, said method comprising:

responsive a first user instruction of loading an single application resident on said mobile device for execution by a processor and without any other user interaction with said mobile device following the first user instruction, rendering a first graphical user interface of a video capture mode to capture a video using a camera system of said mobile device;

upon capture of said video, displaying a second graphical user interface of said single application, said second graphical user interface allowing meta data addition to said video and presenting a share button therein;

responsive to a user interaction with said share button in said second graphical user interface of said single application, displaying a grid like on-screen display comprising a plurality of tiles of various sizes, wherein each tile corresponds to either a contact, or a plurality of contacts grouped together, wherein contacts in said tile are selected and compiled into said contact group by a user by using said single application;

responsive to a user selection of a selected tile of said plurality of tiles, said single application automatically transmitting said video for receipt by one or more recipients as identified by said selected tile; and automatically changing said grid like on-screen display based on a set of predetermined attributes of a plurality of contact groups represented by said plurality of tiles, wherein said automatically changing comprises automatically changing a tile size in said grid like on-screen display, wherein said set of predetermined attributes comprises:

respective numbers of individual contacts within said plurality of contact groups;

respective contact frequencies of said plurality of contact groups; and respective user preferences of said plurality of contact groups.

2. The method of claim 1 wherein said meta data comprises one or more of the following:

a video comment;

a video caption; and
a video thumbnail.

3. The method of claim 1 further comprising:
said single application displaying said plurality of tiles within an on-screen graphical user interface;
responsive to a user selection of a respective tile of said plurality of tiles, entering an edit mode; and
within said edit mode, and responsive to user input, said single application modifying said respective tile.

4. The method of claim 1 further comprising:
maintaining said video within a memory resident within said mobile device subsequent to said transmitting, wherein said video is stored within a photo gallery of an operating system of said mobile device.

5. The method of claim 1 further comprising:
said single application displaying said plurality of tiles within an on-screen graphical user interface;
responsive to a user interaction with said on-screen graphical user interface, entering an edit mode; and
within said edit mode, and responsive to user input, said single application adding new tiles to said plurality of tiles.

6. The method of claim 1 further comprising:
said camera system capturing said video within said video capture mode; and
said single application allowing said video to be recaptured and replaced.

7. The method of claim 1 further comprising: responsive to a user selection of a plurality of selected tiles of said plurality of tiles, said single application automatically transmitting said video for receipt by one or more recipients as identified by said plurality of selected tiles.

8. The method of claim 1, wherein said transmitting said video comprises transmitting said video to said one or more recipients via a server of a social media network by streaming.

9. The method of claim 8 further comprising:
rendering an on-screen chat window;
sending a chat request to said server; and
displaying instant messages exchanged between users within said on-screen chat window.

10. A non-transitory computer-readable storage medium embodying instructions that, when executed by a processing device, cause the processing device to perform a computer implemented method of facilitating video sharing in a social network, said method comprising:
responsive a first user instruction of loading an single application for execution by the processing device and without any other user instruction following the first user instruction, rendering a first graphical user interface of a video capture mode to capture a video using a camera system of a mobile device comprising said processing device;
upon capture of said video, displaying a second graphical user interface of said single application, said second graphical user interface allowing meta data addition to said video and presenting a share button therein;
responsive to a user interaction with said share button, displaying a contact list, wherein said contact list is represented by a grid like on-screen display comprising a plurality of tiles of various sizes, wherein each tile represents a contact group comprising one or more contacts, wherein said one or more contacts are selected and compiled into said contact group by a user by using said single application;
responsive to a user selection from said contact list, said single application automatically transmitting said video to one or more recipients selected from said contact list; and
dynamically changing said grid like on-screen display based on a set of predetermined attributes with respect to said contact groups, wherein said dynamically changing comprises dynamically changing a tile size, wherein said set of predetermined attributes comprises: respective numbers of contacts of said contact groups; respective contact frequencies of said contact groups; and respective user preferences of said contact groups.

11. The non-transitory computer-readable storage medium of claim 10, wherein said meta data addition comprises one or more of:
a video comment;
a video caption; and
a video thumbnail.

12. The non-transitory computer-readable storage medium of claim 10, wherein said method further comprises:
responsive to a user interaction with said on-screen display, editing said contact list and said grid like on-screen display.

13. The non-transitory computer-readable storage medium of claim 10, wherein said transmitting said video comprises:
uploading said video to a server of a social media network; and
specifying a duration for maintaining said video at said server based on a status tag assigned to said video by a user.

14. The non-transitory computer-readable storage medium of claim 10, wherein said method further comprises displaying instant messages exchanged between users via said server.

15. The non-transitory computer-readable storage medium of claim 14, wherein said method further comprises:
displaying a list of inbound and outbound videos and messages associated with a user account of said social media network;
and sending notifications regarding new messages.

16. A handheld computing system comprising:
a processor;
a communication device coupled to said processor;
a touchscreen display coupled to said processor;
a camera subsystem coupled to said processor; and
memory coupled to said processor and comprising instructions that, when executed by said processor, cause the system to perform a method of sharing videos through a social media network, said method comprising:
upon a first user instruction of loading an single application resident and executed by said processor and without any other user instruction following the first user instruction, rendering a first graphical user interface of a video capture mode to capture a video using said camera subsystem;
upon capture of said video, displaying a second graphical user interface of said single application, said second graphical user interface allowing meta data addition to said video and presenting a share button therein;
responsive to a user interaction with said share button, displaying a grid like on-screen display comprising a plurality of tiles Wherein each tile corresponds to r a contact group comprising one or more contacts, wherein said one or more contacts are selected and compiled into said contact group by a user by using said single application; and responsive to a user selection of a selected tile of said plurality of tiles, said single application automatically transmitting said video for receipt by one or more recipients as identified by said selected tile;

dynamically changing said grid like on-screen display based on a set of predetermined attributes with respect to said contact groups, wherein said dynamically changing comprises dynamically changing a tile size, wherein said set of predetermined attributes comprises: respective numbers of contacts of said contact groups; respective contact frequencies of said contact groups; and respective user preferences of said contact groups.

17. The handheld computing system of claim 16, wherein said meta data comprises one or more of the following:
a video comment;
a video caption; and
a video thumbnail.

18. The handheld computing system of claim 16, wherein said method further comprises:
said single application displaying said plurality of tiles within an on-screen graphical user interface;
responsive to a user selection of a respective tile of said plurality of tiles, entering an edit mode; and
within said edit mode, and responsive to user input, said single application modifying said respective tile.

19. The handheld computing system of claim 16, wherein said method further comprises:
presenting an indicia representing another video is shared via said social media network;
receiving a user entry of a comment on said another video;
accessing said another video from a server of said social media network; and
playing back said another video within said single application.

* * * * *